United States Patent [19]

Rodrigues et al.

[11] Patent Number: 5,368,642
[45] Date of Patent: Nov. 29, 1994

[54] FUNCTIONALIZED POLYMERS CONTAINING AMINE GROUPINGS AND THEIR USE AS RETARDERS IN CEMENT SLURRIES

[75] Inventors: Klein A. Rodrigues; Larry S. Eoff, both of Duncan, Okla.

[73] Assignee: Halliburton Company, Duncan, Okla.

[21] Appl. No.: 109,744

[22] Filed: Aug. 20, 1993

[51] Int. Cl.$^5$ .............................................. C04B 24/12
[52] U.S. Cl. .................................. 106/727; 106/724; 106/728; 106/808; 106/810; 106/823; 166/293; 523/130
[58] Field of Search ............... 106/724, 727, 819, 823, 106/728, 808, 810; 166/293; 523/130; 404/267

[56] References Cited

U.S. PATENT DOCUMENTS

| | | | |
|---|---|---|---|
| 2,427,683 | 9/1947 | Ludwig | 166/293 |
| 2,470,505 | 5/1949 | Ludwig | 166/293 |
| 2,848,304 | 8/1958 | Haldas | 166/293 |
| 4,210,455 | 7/1980 | Metcalf et al. | 106/728 |
| 4,657,948 | 4/1987 | Roark et al. | 523/130 |
| 4,676,832 | 6/1987 | Childs et al. | 166/293 |
| 4,706,755 | 11/1987 | Roark et al. | 166/295 |

OTHER PUBLICATIONS

"Functionalization and Chelating Properties of a Porous Polymer Derived From Vinylamine", *Eur. Polym. J.* vol. 28, No. 6, pp. 671-679, 1992, no month.

*Primary Examiner*—Karl Group
*Assistant Examiner*—Michael Marcheschi
*Attorney, Agent, or Firm*—Robert A. Kent; C. Clark Dougherty, Jr.

[57] ABSTRACT

A functionalized polyamine effective to retard the setting rate of a slurry of hydraulic cement is disclosed. A slurry of hydraulic cement in water which includes the functionalized polyamine, which is a polyethylene amine having attached thereto moieties selected from the group consisting of carboxylic acid groups and phosphonic acid groups, is useful to cement a conduit in a subterranean formation penetrated by a wellbore wherein it is desirable to retard the setting rate of the cement to enable placement of the slurry.

20 Claims, No Drawings

FUNCTIONALIZED POLYMERS CONTAINING AMINE GROUPINGS AND THEIR USE AS RETARDERS IN CEMENT SLURRIES

BACKGROUND OF THE INVENTION

1. Field of the Invention

This invention relates to hydraulic cement compositions. It further relates to hydraulic cement compositions which include an additive to retard the rate of hardening of a water slurry of a hydraulic cement composition. Such an additive is referred to in the art as a set retarder. This invention also relates to a method of delaying the set of a water slurry of a hydraulic cement composition. This invention still further relates to a method of cementing a subterranean formation penetrated by a wellbore.

2. Description of the Prior Art

Hydraulic cements, i.e., inorganic cements that harden or set under water, are customarily admixed with water and emplaced as aqueous slurries. The amount of water employed may vary rather extensively dependent largely upon the fluidity of the slurry required and upon the necessary ultimate strength. Additives may be employed to modify the properties of the basic cement slurry.

Ordinary Portland cement, when mixed with water and subjected to elevated temperatures, begins to hydrate immediately and sets in a short time to an extent that its ability to be pumped over a long period of time is limited.

In cementing operations, particularly in moderate and high temperature environments, such as may be encountered in well cementing, it is often necessary, or at least highly desirable, to retard the rate at which a cement slurry would normally set in order to provide a thickening time of sufficient duration to permit placement of the cement slurry where desired. It is a prime requisite of cements that they have the property of remaining fluid and pumpable for a period of time at elevated temperatures to permit placement before setting begins.

Cement compositions having retarded setting rates are useful for a number of purposes including the placement of them in boreholes which penetrate subterranean earth formations, such as wells. In well cementing practice, Portland cement is normally mixed with water, based on the weight of the dry cement, to form a slurry which is pumped into the well to the desired point behind the casing where it is allowed to harden. Inasmuch as wells are frequently of great depth, extended times are required to mix the cement slurry and pump it to the desired point. It is important, therefore, that the cement employed have a thickening time long enough to allow placement of the cement slurry in the desired location in the well before it becomes stiff and unpumpable. Experience has shown that the elevated pressures and temperatures encountered in cementing wellbores which penetrate subterranean formations accelerate the normal setting rate of cement to the point that the placement time of the cement approaches or exceeds the thickening time of the cement thus rendering difficult or impossible the placement of the cement slurry in the desired location in the well. Successful placement of the slurry, therefore, requires that the slurry remain fluid and pumpable at high temperatures for several hours before it begins to harden. However, after the slurry has been pumped into place, it is desirable that hydration or set proceed at a rate at which the slurry will attain its final set and develop considerable strength within about 24 hours.

Various methods of retarding the setting rates of cements have been employed in order to make possible the placement of cement in wells. In general, cements for use in wells are coarsely ground materials prepared by (1) altering the composition of the cement itself, (2) adding various special retarding agents to the cement, or (3) a combination of methods 1 and 2. Set retarding agents which have been employed include casein, sodium carboxymethyl cellulose, carboxymethyl hydroxyethyl cellulose, dextrin, starch, compounds of boron, bicarbonates and tartrates, water soluble gums, lignosulfonates, copolymers of acrylic acid and 2-acrylamido, 2-methylpropane sulfonic acid and combinations of these and other materials.

SUMMARY OF THE INVENTION

By this invention there is thus provided a water slurry of a hydraulic cement composition containing a set retarder consisting of a water soluble, synthetic polymeric material. The set retarder functions to extend the set time of the composition for the time necessary to enable the slurry to be placed into a desired location in a well bore which penetrates a subterranean formation before the slurry experiences loss of sufficient fluidity to enable the slurry to be pumped.

DESCRIPTION OF PREFERRED EMBODIMENTS

The set retarder useful herein can be made by reacting a polyethylene amine with a halogenated carboxylic acid in the presence of an alkali metal hydroxide or it can be made by reacting a polyethylene amine with phosphorous acid and an aldehyde in the presence of hydrochloric acid. The reactions broadly referred to above produce a functionalized polyamine which is the water soluble, synthetic polymeric material useful herein which, more specifically, is a polyethylene amine having attached thereto moieties selected from the group consisting of carboxylic acid groups and phosphonic acid groups. The polymer includes repeating units described by the structural formula

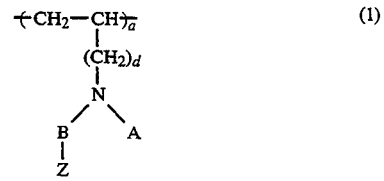 (1)

wherein B represents the structure

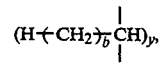

A is hydrogen or $(B-Z)$,

Z is selected from the group consisting of

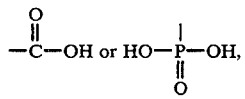

d is the number 0 or 1,
y is a number in the range of from 1 to 4,
a is a number in the range of from about 200 to 20,000 when d is 0 and 90 to 1800 when d is 1, and
b is a number from 0 to 3.

The functionalized polyamine useful herein having the repeating units as shown in formula (1), above, due to its nature of preparation, is a random polymer. In the context of this invention the term "random polymer" means that all of the repeating amine units,

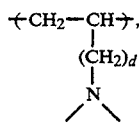

in the polymer may or may not have attached thereto any of the functional group, $-(B-Z)$, and furthermore, some repeating units in the polymer may include two of the functional groups, i.e. A is $-(B-Z)$, and some of the functional groups in the polymer may include only one of the $-(B-Z)$ groups, i.e., A is hydrogen. Still further, it is not known how many of the amine units in a given polymer have the functional group attached or in what order or sequence they occur.

In one aspect of this invention, the set retarder is the reaction product of a polyethylene amine selected from the group consisting of polyvinylamine,

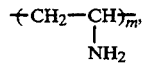

and polyallylamine,

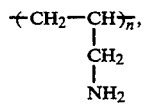

and a halogenated carboxylic acid in the presence of an alkali metal hydroxide wherein the number of ethylene units, m, in the polyvinylamine is in the range of from about 200 to about 20,000 and preferably in the range of from about 2,000 to about 6000, and wherein the number of ethylene units, n, in the polyallylamine is in the range of from about 90 to 1800 and preferably in the range of from about 170 to about 350.

In another aspect of this invention, the set retarder is the reaction produce of a polyethylene amine, as set out above, an aldehyde and phosphorous acid in the presence of hydrochloric acid.

The polyethylene amine or its hydrochloride salt, useful herein to prepare the set retarder of this invention, is water soluble, and will, upon reaction with the previously described ingredients, produce a liquid phase set retarder which is also water soluble and which, when dissolved in water, exhibits a viscosity which enables the set retarder to be conveniently mixed with a slurry of cement and pumped to a desired location. Polyethylene amines meeting the above requirements are polyallylamines and polyvinylamines having the number of repeating units as previously described. That is, the number of repeating units,

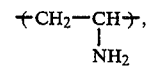

present in the polyvinylamine is in the range of about 200 to about 20,000 and the number of repeating units,

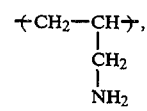

present in the polyallylamine is in the range of about 90 to about 1800.

Polyethylene amines of the type described above can be obtained from Monomer-Polymer Laboratories, Inc., of Trevose, Pa.

The halogenated carboxylic acid useful herein is any aliphatic compound defined by the general formulas

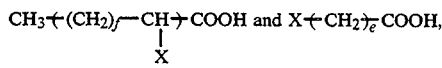

wherein X is a halogen selected from chlorine, bromine, iodine and fluorine, f is a number in the range of from 0 to 2 and wherein e is a number in the range of from 1 to 4.

Specific examples of halogenated carboxylic acids within the scope of the above formulas include, but are not limited to, chloroacetic acid, 3-chloropropionic acid, 2-chloropropionic acid, 4-chlorobutyric acid, 5-chlorovaleric acid, 2-chlorobutyric acid, 2-chlorovaleric acid, bromoacetic acid, 3-bromopropionic acid, 2-bromopropionic acid, 2-bromobutyric acid, 4-bromobutyric acid, 2 bromovaleric acid, iodoacetic acid and 3-iodopropionic acid.

Chloroacetic acid is preferred for use herein.

The alkali metal hydroxides for use herein are sodium hydroxide, potassium hydroxide and lithium hydroxide, wherein potassium hydroxide is the most preferred.

The aldehyde useful herein is any aliphatic compound defined by the general formula

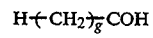

wherein g is a number in the range of from 0 to 5.

Specific examples of aldehydes within the scope of the above formula include, but are not limited to, formaldehyde, acetaldehyde, propionaldehyde, butyraldehyde and pentylaldehyde wherein formaldehyde is preferred.

EXAMPLE I

In one preferred embodiment, the set retarder of this invention is made by reacting, in 60 grams of water, 1.2 grams of polyallylamine hydrochloride with 1 gram of chloroacetic acid in the presence of 2.1 grams of potassium hydroxide. The reaction is conducted under reflux conditions at 50° C. for 24 hours. The liquid product, a carboxylic acid functionalized polyamine, contains about 4% by weight of the functionalized polyamine. In this example, the ratio of the number of moles of chloroacetic acid to the number of moles of repeating units in the polyallyamine is about 0.8 to 1.

EXAMPLE II

In another preferred embodiment, the set retarder of this invention is made by reacting, in 100 grams of water, 1 gram of polyallylamine, 3.48 grams of phosphorous acid and 3.5 grams of 37% by weight formaldehyde solution in the presence of 2.1 grams of 37% hydrochloric acid. The reaction is conducted under reflux conditions at about 100 20 C. for about 3.5 hours. The liquid product, a phosphonic acid functionalized polyamine, contains about 5.2% by weight of the functionalized amine. The polyallylamine employed in this Example was identical to the one employed in Example I, above. In this example, the ratio of the number of moles of phosphorous acid to the number of moles of repeating units in the polyallyamine is about 4 to 1.

The procedures described in Examples I and II, above, for making the set retarder of this invention are directed to the preparation of two specific preferred embodiments. However, a more generalized procedure for making the set retarder is provided below.

When the set retarder of this invention is a carboxylic acid functionalized polyamine, a polyethylene amine, as above described, is reacted with a halogenated carboxylic acid, as above described, in an amount in the range of from about 0.5 to about 5, preferably 1 to 3 and still more preferably about two moles of the halogenated carboxylic acid per mole of amine repeating unit.

The quantity of alkali metal hydroxide employed when making a carboxylic acid functionalized polyamine is an amount in the range of from about 2 to about 10, preferably 3 to 7 and still more preferably about 5 moles of alkali metal hydroxide per mole of amine repeating unit.

For purposes of this invention, the number of moles of amine repeating unit in a given polyethylene amine is determined by dividing the actual weight of polyethylene amine to be employed in the reaction by the molecular weight of the specific repeating unit in the polyethylene amine.

When the set retarder of this invention is a phosphonic acid functionalized polyamine, a polyethylene amine, as above described, is reacted with phosphorous acid and an aldehyde, as above described, in the presence of concentrated hydrochloric acid in a water solvent under reflux conditions for a suitable period of time. In a preferred procedure, the aldehyde is the final ingredient added to the reaction mixture before reflux is initiated.

The quantity of aldehyde employed is an amount in the range of from about 0.5 to about 8, preferably 1 to 7 and still more preferably about 3 to about 4 moles aldehyde per mole of amine repeating unit in the polyethylene amine employed. The most preferred quantity of aldehyde is 4 moles per mole of amine repeating unit.

The quantity of phosphorous acid ($H_3PO_3$) employed is an amount in the range of from about 0.5 to about 5, preferably about 1 to about 4, and still more preferably about 2 to about 4 moles phosphorous acid per mole of amine repeating unit in the polyethylene amine employed. The most preferred quantity of phosphorous acid is 4 moles per mole of amine repeating unit.

The quantity of hydrochloric acid employed is an amount in the range of from about 0.5 to about 5, preferably about 1 to about 4, and still more preferably about 1 to about 2 moles of hydrochloric acid per mole of amine repeating unit in the polyethylene amine employed. The most preferred quantity of hydrochloric acid is 2 moles per mole of amine repeating unit. The hydrochloric acid is most conveniently employed in a concentrated aqueous solution having about 37% HCl by weight of solution.

The set retarder of this invention is admixed with a water slurry of hydraulic cement in an amount effective to retard the setting rate of the cement for a time sufficient to enable the cement to be pumped into a desired location. That is, the cement slurry must retain sufficient fluidity to enable it to be pumped for a given period of time. This time is known in the art as "thickening time" and is measured in a laboratory apparatus and reported as hours and minutes at a given temperature as described in Section 8 of API Specification 10. For purposes of this invention, a slurry of cement is considered to possess sufficient fluidity to be pumped at any consistency equal to or less than 70 Bearden units of consistency, i.e., 70 Bc. The time required to reach 70 Bc during the above referred to laboratory test is called "thickening time" and is also called "pumping time."

To obtain thickening times sufficient to pump a hydraulic cement slurry in place in accordance with this invention, an effective amount of the set retarder of this invention which is believed to be an amount in the range of from about 0.1 to about 2, preferably about 0.2 to about 1.5 and still more preferably about 0.5 to 1.0 pounds of set retarder per pound of dry cement is added to the slurry of cement. The set retarder may be added in a dry (100% active) form or it may be added in a dilute form (less than 100% active) as may be convenient under the circumstances.

Portland cement is generally preferred for use in the compositions of this invention because of its low cost, availability and general utility, but other cements can also be utilized. Portland cements of API Classes H and G are preferred cements for use in this invention in most instances, although the other API classes of cement can also be utilized. The characteristics of these cements are described in API Specification 10, Second Edition, of the American Petroleum Institute which is incorporated herein by reference. A highly useful and effective cement slurry base for use in practicing this invention utilizes API Class H Portland cement mixed with water to provide a density of from about 11.3 to about 18.0 pounds per gallon.

The water used in the cement compositions can be water from any source, provided that it does not contain an excess of compounds which adversely react with other components in the cement compositions or otherwise affect the stability of the compositions.

A particularly preferred set delayed cement composition of this invention capable of being retained in a pumpable fluid state for a long time period is comprised of API Class H Portland cement and water in an amount in the range of from about 38% to about 46% by weight of dry cement.

In carrying out the methods of this invention for cementing a zone at a remote location, a set delayed cement composition of the type described above is first prepared. The pumpable set delayed composition is then pumped into the zone to be cemented by well known procedures and allowed to set.

A hydraulic cement composition containing the set-retarder of this invention can be used in the temperature range of from about 120° to about 250° F.

As will be understood by those skilled in the art, a variety of additives can be incorporated in the cement compositions to modify the properties thereof such as dispersants, viscosifiers and weight adjusting materials. Also, additives for reducing fluid loss to surrounding formations, for reducing friction during pumping, and for imparting other properties to the cement compositions can be utilized.

In order to facilitate a clear understanding of the set delayed compositions and methods of this invention, the following additional examples are given.

EXAMPLE III

A set retarder of this invention, as prepared in Example I, above, was tested as a retarder for various cement slurries. The slurries were also tested for compressive strength. The thickening times obtained are reported in Table 1 and the compressive strengths are reported in Table 2.

TABLE 1

Thickening time date for a slurry containing Lone Star Class H Cement, polyallylamine functionalized with carboxylic acid groups, 4.3 gal/sk water*, 16.4 lb/gal.

| polymer (% by weight dry cement) | Thickening Time | | |
|---|---|---|---|
| | 140° F. (hr:min) | 200° F. (hr:min) | 250° F. (hr:min) |
| 0.4 | 3:32 | 2:32 | |
| 0.5 | 4:57 | 5:05 | |
| 1.0 | | | 1:30 |

TABLE 2

Compressive strength data for a slurry containing Lone Star Class H Cement, polyallylamine functionalized with carboxylic acid groups, 4.3 gal/sk water*, 16.4 lb/gal.

| polymer (% by weight of dry cement) | 24 Hr Comp Str @ 3000 psi and 250° F. |
|---|---|
| 0.5 | 3340 |

*38 lb water per 100 lb dry cement

The data in Tables 1 and 2 indicates that the set retarder of this invention is an excellent retarder in the temperature range of 140° to 250° F. and develops excellent compressive strength in 24 hours.

EXAMPLE IV

Various set retarders of this invention, prepared generally as described in Example II, were tested to obtain thickening times. The quantity of retarder employed in each test was the same, but the ratio of ingredients and reaction times employed to make the retarder were varied. The results are reported in Table 3.

TABLE 3

Reaction conditions and thickening time date for the phosphonic acid functionalized polyallylamine.

| Mole ratio of polyallylamine repeating unit to $H_3PO_3$ to HCl to HCHO | Rxn Time (hours at 212° F.) | Temp of Thickening Time Test (°F.) | Thickening Time[1] (hr:min) |
|---|---|---|---|
| 1.0:2.5:2.0:5.0 | 3.5 | 140 | 2:45 |
| 1.0:2.2:2.0:3.5 | 28.5 | 140 | 1:58 |
| 1.0:2.5:2.0:4.0 | 24 | 140 | 2:29 |
| 1.0:2.5:2.0:4.5 | 24 | 140 | 2:18 |
| 1.0:4.0:2.0:4.0 | 7 | 140 | 3:41 |
| 1.0:4.0:2.0:4.0 | 3.5 | 140 | 4:22 |
| 1.0:4.0:4.0:8.0 | 3.5 | 200 | 2:26 |
| 1.0:4.0:2.0:4.0 | 3.5 | 200 | 2:20 |

[1]The thickening times were run in Lone Star Class H Cement, 0.5% polymer by wt of dry cement, 4.3 gal/sk water*, 16.4 lb/gal. The thickening time data for these samples are listed in Table 3. The data for these samples are listed in Table 3. The data inidcates that this polymer is a good low temperature cement retarder.
*38 lb water per 100 lb cement

What is claimed is:

1. A cement composition comprising hydraulic cement, water present in an amount sufficient to form a pumpable slurry and a set retarder present in an amount in the range of from about 0.1 to about 2 pounds of set retarder per pound of dry cement in said slurry, said set retarder consisting of a functionalized polyethylene amine having attached thereto moieties selected from the group consisting of carboxylic acid groups and phosphonic acid groups, wherein the repeating unit of said functionalized polyamine is defined by the structural formula

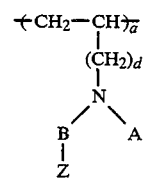

wherein B represents the structure

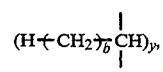

A is hydrogen or $-(B-Z)$,

Z is selected from the group consisting of

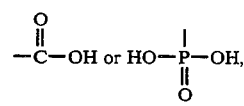

d is the number 0 or 1,
y is a number in the range of from 1 to 4,
a is a number in the range of from about 200 to 20,000 when d is 0 and 90 to 1800 when d is 1, and
b is a number from 0 to 3.

2. The composition of claim 1 wherein Z in said repeating unit is

and d is 1.

3. The composition of claim 2 wherein y in said repeating unit is 1.

4. The composition of claim 3 wherein b in said repeating unit is 0.

5. The composition of claim 1 wherein Z in said repeating unit is

and d is 0.

6. The composition of claim 5 is wherein y in said repeating unit is 1.

7. The composition of claim 6 wherein b in said repeating unit is 0.

8. The composition of claim 1 wherein Z in said repeating unit is

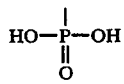

and d is 1.

9. The composition of claim 8 wherein y in said repeating unit is 1.

10. The composition of claim 9 wherein b in said repeating unit is 0.

11. The composition of claim 1 wherein Z in said repeating unit is

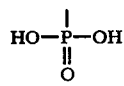

and d is 0.

12. The composition of claim 11 wherein y in said repeating unit is 1.

13. The composition of claim 12 wherein b in said repeating unit is 0.

14. The composition of claim 1 wherein said set retarder is present in an amount in the range of from about 0.2 to about 1.5 pounds of set retarder per pound of dry cement in said slurry.

15. The composition of claim 14 wherein said set retarder is present in an amount in the range of from about 0.5 to about 1 pound of said set retarder per pound of dry cement in said slurry.

16. A method of retarding the setting rate of a cement composition comprised of hydraulic cement and water, said method comprising adding to said cement composition an amount of set retarder effective to retard the setting rate of said cement composition wherein said set retarder is a polyethylene amine having attached thereto moieties selected from the group consisting of carboxylic acid groups and phosphonic acid groups, wherein the repeating unit of said polyethylene amine is defined by the structural formula

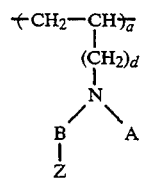

wherein B represents the structure

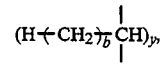

A is hydrogen or $-(B-Z)$,

Z is selected from the group consisting of

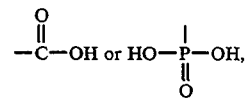

d is the number 0 or 1, y is a number in the range of from 1 to 4, a is a number in the range of from about 200 to 20,000 when d is 0 and 90 to 1800 when d is 1, and b is a number from 0 to 3.

17. The method of claim 16 wherein the amount of said set retarder added to said composition is in the range of from about 0.1 to about 2 pounds of said set retarder per pound of dry hydraulic cement.

18. The method of claim 17 wherein said set retarder is selected from the reaction products of polyallylamine and chloroacetic acid and polyallylamine, phosphorous acid and formaldehyde.

19. A method of cementing a conduit in a wellbore penetrating a subterranean formation comprising:

preparing a cement composition comprising hydraulic cement, water and a set retarder;

pumping said composition into a desired location in the annular space between said conduit and said wellbore; and permitting said composition to set in said desired location;

wherein said set retarder is present in said composition in an amount effective to retard the setting rate of said cement composition and is a polyethylene amine having attached thereto moieties selected from the group consisting of carboxylic acid groups and phosphonic acid groups, wherein the repeating unit of said polyethylene amine is defined by the structural formula

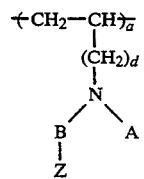

wherein B represents the structure

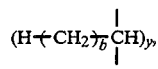

A is hydrogen or ⁻(B—Z),

Z is selected from the group consisting of

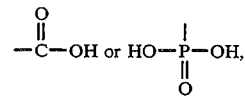

d is the number 0 or 1, y is a number in the range of from 1 to 4, a is a number in the range of from about 200 to 20,000 when d is 0 and 90 to 1800 when d is 1, and b is a number from 0 to 3.

20. The method of claim 19 wherein the amount of said set retarder present in said composition is in the range of from about 0.1 to about 2 pounds of said set retarder per pound of dry hydraulic cement in said composition.

* * * * *